United States Patent
Diamond et al.

(10) Patent No.: US 12,208,691 B2
(45) Date of Patent: Jan. 28, 2025

(54) ELECTRIC VEHICLE ENERGY MANAGEMENT SYSTEM

(71) Applicant: FORD GLOBAL TECHNOLOGIES, LLC, Dearborn, MI (US)

(72) Inventors: Brendan F. Diamond, Grosse Pointe, MI (US); Erik J. Christen, Royal Oak, MI (US); Matthew Joseph, St. Clair Shores, MI (US); Shehan Haputhanthri, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/418,807

(22) Filed: Jan. 22, 2024

(65) Prior Publication Data
US 2024/0157796 A1    May 16, 2024

Related U.S. Application Data

(62) Division of application No. 17/180,092, filed on Feb. 19, 2021, now Pat. No. 11,904,698.

(51) Int. Cl.
*B60L 1/00* (2006.01)
*B60K 35/00* (2006.01)
(Continued)

(52) U.S. Cl.
CPC .............. *B60L 1/006* (2013.01); *B60K 35/00* (2013.01); *B60L 58/12* (2019.02); *B60K 35/28* (2024.01); *B60K 35/60* (2024.01); *B60K 2360/178* (2024.01); *B60K 2360/334* (2024.01); *B60K 2360/785* (2024.01)

(58) Field of Classification Search
CPC .... B60L 1/006; B60L 58/12; B60L 2240/622; B60L 2250/16; B60L 2260/52; B60L 2260/54; B60L 50/16; B60L 53/305; B60L 53/60; B60L 53/66; B60L 1/06; B60L 58/14; B60L 1/00; B60L 2240/54; B60L 2260/44; B60K 35/00; B60K 35/28; B60K 35/60; B60K 2360/178; B60K 2360/334; B60K 2360/785
See application file for complete search history.

(56) References Cited

U.S. PATENT DOCUMENTS 8,755,994 B2    6/2014    Ford
9,292,976 B2    3/2016    Ford
(Continued)

FOREIGN PATENT DOCUMENTS

CN    104442570 A    3/2015
CN    108258761 A    7/2018

OTHER PUBLICATIONS

Auxiliary systems consumption in electric vehicle, by Mario Vražić; Article in Przeglad Elektrotechniczny; 2014; 5 pages.

*Primary Examiner* — Yuen Wong
(74) *Attorney, Agent, or Firm* — David B. Kelley; Brooks Kushman P.C.

(57) ABSTRACT

A controller selectively generates output for display indicative of a recommendation against use of a power outlet in a vehicle with devices external to the vehicle having a power rating greater than a predefined power rating threshold based on a difference between a current state of charge of a battery of the vehicle and a required state of charge for the battery.

5 Claims, 4 Drawing Sheets

(51) Int. Cl.
*B60L 58/12* (2019.01)
*B60K 35/28* (2024.01)
*B60K 35/60* (2024.01)

(56) References Cited

U.S. PATENT DOCUMENTS 9,476,719 B2 10/2016 Meyer et al.
2020/0047629 A1* 2/2020 Cho .................... B60L 15/2045

* cited by examiner

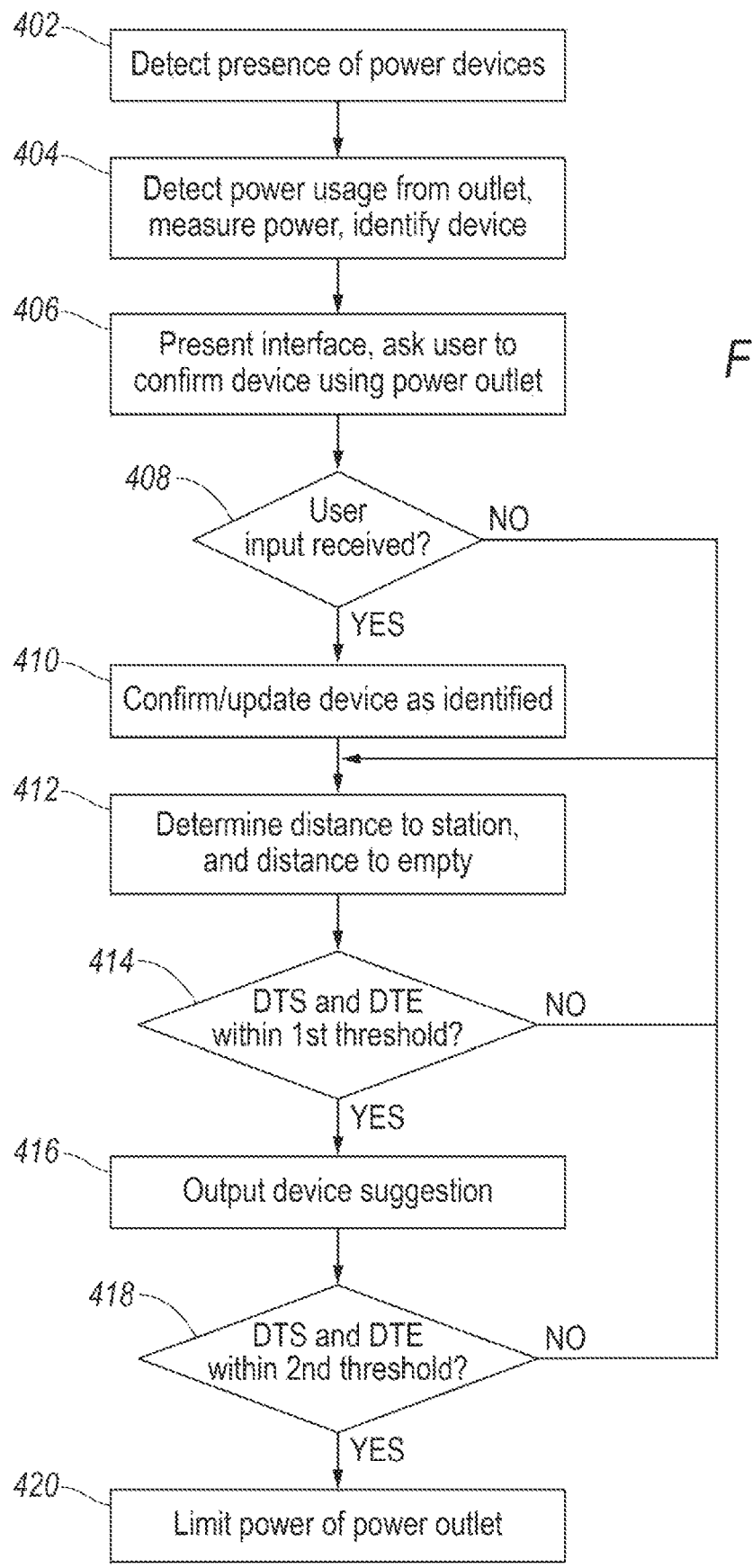

ELECTRIC VEHICLE ENERGY MANAGEMENT SYSTEM

CROSS-REFERENCE TO RELATED APPLICATION

This application is a divisional of U.S. application Ser. No. 17/180,092 filed Feb. 19, 2021, the disclosure of which is hereby incorporated in its entirety by reference herein.

TECHNICAL FIELD

The present disclosure relates to an energy management system for an electric vehicle.

BACKGROUND

An electric vehicle may provide power to various devices via a power outlet installed on the vehicle. For instance, the electric vehicle may supply electric power to devices from a high-voltage traction battery, which may result in a reduced driving range of the vehicle. Different power configurations of the power devices may have different impacts on the vehicle driving range reduction.

SUMMARY

A vehicle includes a battery, a power outlet that supplies power from the battery to a device plugged into the power outlet and external to the vehicle, a display, and a controller. The controller, responsive to a difference between distance to empty and distance to station values for the vehicle being less than a first distance threshold, generates output for the display indicative of a recommendation against use of the power outlet with devices external to the vehicle having a power rating greater than a predefined power rating threshold.

A power system for a vehicle includes a battery, a power outlet that supplies power from the battery to a device plugged into the power outlet and external to the vehicle, and a controller. The controller selectively generates output for display indicative of a recommendation against use of the power outlet with devices external to the vehicle having a power rating greater than a predefined power rating threshold based on a difference between a current state of charge of the battery and a required state of charge for the battery.

A method includes, while a difference between distance to empty and distance to station values for a vehicle is less than a distance threshold, limiting a power available from a power outlet in the vehicle arranged to supply power from a battery of the vehicle to a device plugged into the power outlet and external to the vehicle, and after the difference becomes greater than the distance threshold, increasing the power available from the power outlet.

BRIEF DESCRIPTION OF THE DRAWINGS

FIG. 4 is an example flow diagram for a vehicle power management process.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
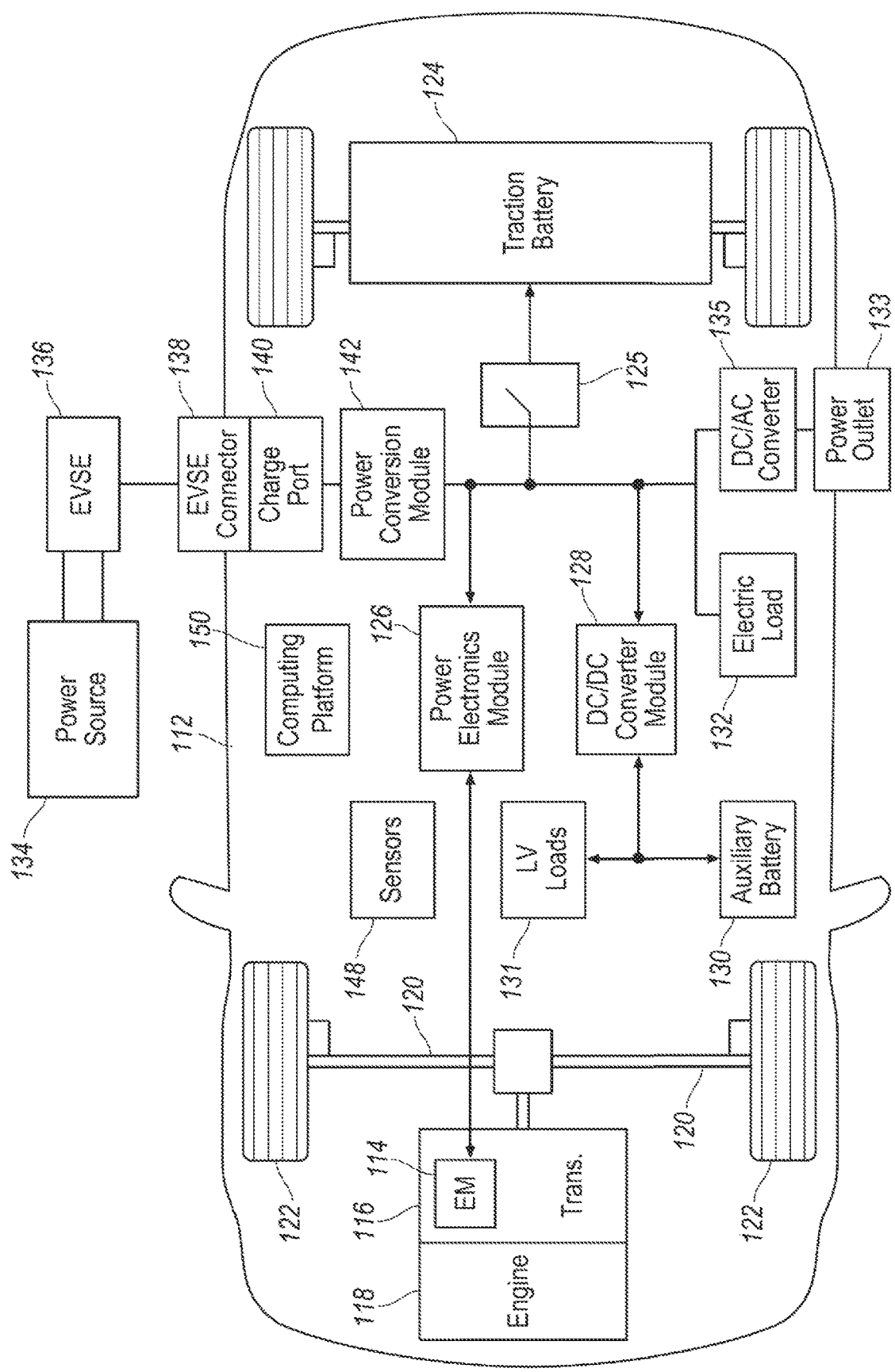
FIG. 1 is a diagram of an electrified vehicle illustrating drivetrain and energy storage components including an electric machine.

FIG. 1 depicts an electrified vehicle 112 that may be referred to as a plug-in hybrid-electric vehicle (PHEV), a battery electric vehicle (BEV), a mild hybrid-electric vehicle (MHEV), and/or a full hybrid electric vehicle (FHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 may store energy that can be used by the electric machines 114. The vehicle battery pack 124 may provide a high voltage direct current (DC) output. The traction battery 124 may be electrically coupled to one or more power electronics modules 126 (such as a traction inverter). One or more contactors 125 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems having one or more low-voltage loads 131 may be electrically coupled to the auxiliary battery 130. One or more electrical loads 132 may be coupled to the high-voltage bus/rail. The electrical loads 132 may have an associated controller that operates and controls the electrical loads 146 when appropriate. Examples of electrical loads 132 may be a fan, an electric heating element, and/or an air-conditioning compressor. The vehicle 112 may be further configured to provide electric power supply to an external power device (not shown) via one or more power outlets (power sockets) 133 through a DC/AC converter 135. The power outlet 133 may be located inside and/or outside the vehicle cabin. For instance, the power outlet 133 may be receptacles configured to correspond to NEMA connectors used in North America, although power receptacles supporting other standards may be used under essentially the same concept. The DC/AC converter 135 may be electrically coupled between the traction battery 124 and the power outlet 133 and configured to convert the high voltage DC current from the traction battery 124 into an AC current with a corresponding voltage (e.g. 110V, 220V or the like) compatible with the external power devices.

The electrified vehicle 112 may be configured to recharge the traction battery 124 from an external power source 134. The external power source 134 may be a connection to an electrical outlet. The external power source 134 may be electrically coupled to a charger or electric vehicle supply equipment (EVSE) 136. The external power source 134 may be an electrical power distribution network or grid as provided by an electric utility company. The EVSE 136 may provide circuitry and controls to regulate and manage the transfer of energy between the power source 134 and the vehicle 112. The external power source 134 may provide DC or AC electric power to the EVSE 136. The EVSE 136 may have a charge connector 138 for plugging into a charge port 140 of the vehicle 112. The charge port 140 may be any type of port configured to transfer power from the EVSE 136 to the vehicle 112. The charge port 140 may be electrically coupled to a charger or on-board power conversion module 142. The power conversion module 142 may condition the power supplied from the EVSE 136 to provide the proper voltage and current levels to the traction battery 124. The power conversion module 142 may interface with the EVSE 136 to coordinate the delivery of power to the vehicle 112. The EVSE connector 138 may have pins that mate with corresponding recesses of the charge port 140. Alternatively, various components described as being electrically coupled or connected may transfer power using a wireless inductive coupling.

The vehicle 112 may be provided with various sensors 148 to perform various measurements. As a few non-limiting examples, the sensors 148 may include one or more vehicle weight sensors configured to measure a weight of the vehicle 112 which may be used for driving range estimation. In general, heavier vehicle weight may reduce vehicle driving range. The sensors 148 may further include a temperature sensor configured to measure an ambient temperature which may affect the driving range of the vehicle 112. The sensors 148 may further include an electric sensor in communication with the power outlet 133 configured to detect the type of the external power devices connected to the power outlet 133. The sensor data may be transmitted to a controller or computing platform 150 for processing and analysis.

Figure 2:
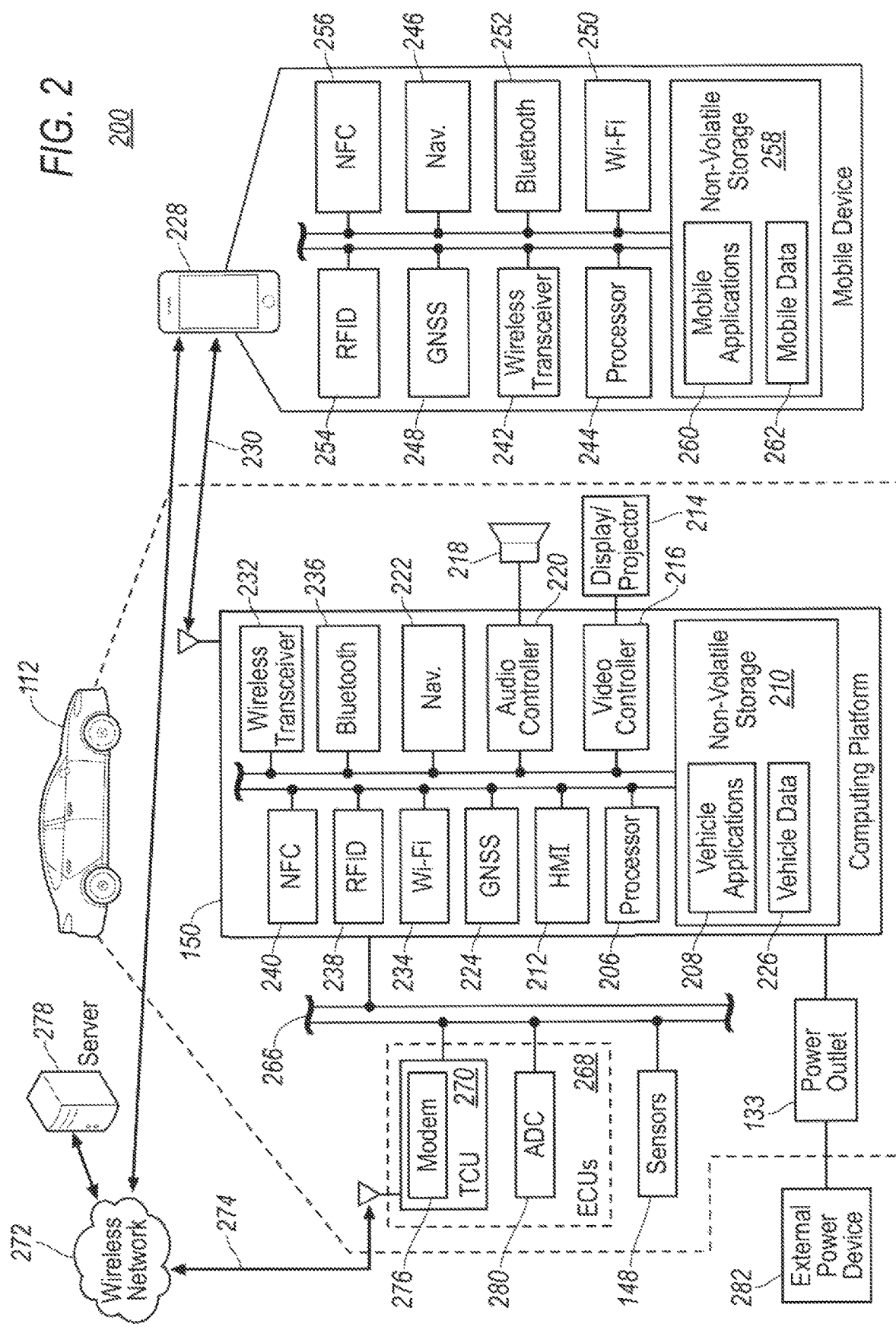
FIG. 2 is an example block topology of a vehicle system.

Referring to FIG. 2, an example block topology of a vehicle system 200 of one embodiment of the present disclosure is illustrated. As an example, the system 200 may include the SYNC system manufactured by The Ford Motor Company of Dearborn, Michigan. It should be noted that the illustrated system 200 is merely an example, and more, fewer, and/or differently located elements may be used.

As illustrated in FIG. 2, the computing platform 150 may include one or more processors 206 configured to perform instructions, commands, and other routines in support of the processes described herein. For instance, the computing platform 150 may be configured to execute instructions of vehicle applications 208 to provide features such as navigation, remote controls, and wireless communications. Such instructions and other data may be maintained in a non-volatile manner using a variety of types of computer-readable storage medium 210. The computer-readable medium 210 (also referred to as a processor-readable medium or storage) includes any non-transitory medium (e.g., tangible medium) that participates in providing instructions or other data that may be read by the processor 206 of the computing platform 150. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The computing platform 150 may be provided with various features allowing the vehicle occupants/users to interface with the computing platform 150. For example, the computing platform 150 may receive input from HMI controls 212 configured to provide for occupant interaction with the vehicle 112. As an example, the computing platform 150 may interface with one or more buttons, switches, knobs, or other HMI controls configured to invoke functions on the computing platform 150 (e.g., steering wheel audio buttons, a push-to-talk button, instrument panel controls, etc.).

The computing platform 150 may also drive or otherwise communicate with one or more displays 214 configured to provide visual output to vehicle occupants by way of a video controller 216. In some cases, the display 214 may be a touch screen further configured to receive user touch input via the video controller 216, while in other cases the display 214 may be a display only, without touch input capabilities. As a few non-limiting examples, the display 214 may be implemented as a liquid crystal display (LCD) screen mounted on the dashboard inside the vehicle 112. Additionally or alternatively, the display 214 may be a projector mounted inside or outside the vehicle cabin configured to project an image onto a surface to interact with the vehicle user. In case that the vehicle 112 is a pickup truck having an open bed, the projector 214 may be mounted on an edge or rail of the bed and configured project the image onto a rear window of the vehicle cabin allowing a user behind the vehicle to see the image. Alternatively, the projector 214 may be installed inside the vehicle cabin and project the image onto the rear window from the inside which still allows the user to see the image from the outside. The computing platform 150 may also drive or otherwise communicate with one or more speakers 218 configured to provide audio output and input to vehicle occupants by way of an audio controller 220.

The computing platform 150 may also be provided with navigation and route planning features through a navigation controller 222 configured to calculate navigation routes responsive to user input via, for example, the HMI controls 212, and output planned routes and instructions via the speaker 218 and the display 214. Location data that is needed for navigation may be collected from a global navigation satellite system (GNSS) controller 224 configured to communicate with multiple satellites and calculate the location of the vehicle 112. The GNSS controller 224 may be configured to support various current and/or future global or regional location systems such as global positioning system (GPS), Galileo, Beidou, Global Navigation Satellite System (GLONASS) and the like. Map data used for route planning may be stored in the storage 210 as a part of the vehicle data 226. Navigation software may be stored in the storage 210 as one the vehicle applications 208.

The computing platform 150 may be configured to wirelessly communicate with a mobile device 228 of the vehicle users/occupants via a wireless connection 230. The mobile device 228 may be any of various types of portable computing devices, such as cellular phones, tablet computers, wearable devices, smart watches, smart fobs, laptop computers, portable music players, or other devices capable of communication with the computing platform 150. A wireless transceiver 232 may be in communication with a Wi-Fi controller 234, a Bluetooth controller 236, a radio-frequency identification (RFID) controller 238, a near-field communication (NFC) controller 240, and other controllers such as a Zigbee transceiver, an IrDA transceiver, a ultra-wide band (UWB) controller (not shown), and be configured to communicate with a compatible wireless transceiver 242 of the mobile device 228.

The mobile device 228 may be provided with a processor 244 configured to perform instructions, commands, and other routines in support of the processes such as navigation, telephone, wireless communication, and multi-media processing. For instance, the mobile device 228 may be provided with location and navigation functions via a navigation controller 246 and a GNSS controller 248. The mobile device 228 may be provided with the wireless transceiver 242 in communication with a Wi-Fi controller 250, a Bluetooth controller 252, a RFID controller 254, an NFC controller 256, and other controllers (not shown), configured to communicate with the wireless transceiver 232 of the computing platform 150. The mobile device 228 may be further provided with a non-volatile storage 258 to store various mobile application 260 and mobile data 262.

The computing platform 150 may be further configured to communicate with various components of the vehicle 112 via one or more in-vehicle networks 266. The in-vehicle network 266 may include, but is not limited to, one or more of a controller area network (CAN), an Ethernet network, and a media-oriented system transport (MOST), as some examples. Furthermore, the in-vehicle network 266, or portions of the in-vehicle network 266, may be a wireless network accomplished via Bluetooth low-energy (BLE), Wi-Fi, UWB, or the like.

The computing platform 150 may be configured to communicate with various electronic control units (ECUs) 268 of the vehicle 112 configured to perform various operations. For instance, the ECUs 268 may include a telematics control unit (TCU) 270 configured to control telecommunication between vehicle 112 and a wireless network 272 through a wireless connection 274 using a modem 276. The wireless connection 274 may be in the form of various communication networks, for example, a cellular network. Through the wireless network 272, the vehicle may access one or more servers 278 to access various content for various purposes. It is noted that the terms wireless network and server are used as general terms in the present disclosure and may include any computing network involving carriers, routers, computers, controllers, circuitry or the like configured to store data and perform data processing functions and facilitate communication between various entities. The ECUs 268 may further include an autonomous driving controller (ADC) 280 configured to monitor and operate an autonomous driving feature of the vehicle 112. Driving instructions may be received remotely from the server 278. The ADC 280 may be configured to perform the autonomous driving features using the driving instructions combined with navigation instructions from the navigation controller 222. Additionally, the server 278 may be configured to track tool usage and power consumption based on job site location for vehicle dispatching purposes. Vehicle logistic planning may be performed based on tool need at specific job sites. As an example, a first vehicle (not shown) may have a maximum output power of 6 kW and a second vehicle (not shown) may have a maximum output power of 10 kW via the power outlet 133. In case the job site requires 8 kW output power, the second vehicle may be dispatched via the server 278.

As discussed above with reference to FIG. 1, the computing platform 150 may monitor and control the operation of the power outlet 133 that is configured to supplying electric power to the external power device 282. The external power device 282 is used as a general term in the present disclosure and may include various devices, apparatuses, and hardware powered by electricity. As a few non-limiting examples, the external power devices 282 may include one or more power tools such as power drill, electric welder, electric lights, or the like each having a power rating. The sensors 148 may be configured to detect the type and power consumption of the external power devices 282 and report the detected information to the computing platform. Additionally or alternatively, one or more of the external power devices 282 may be provided with a beacon (not shown) configured to communicate with the wireless transceiver 232 such that the computing platform 150 may identify the type and power of the external power device. As an example, a lookup table stored in the storage as a part of the vehicle data 226 may be used to identify a corresponding power device using the beacon information received from the external power device 282. Alternatively, the computing platform 150 may obtain the information about the external power device 282 via the mobile device 228 in communication with the beacon of each respective device 282.

Figure 3:
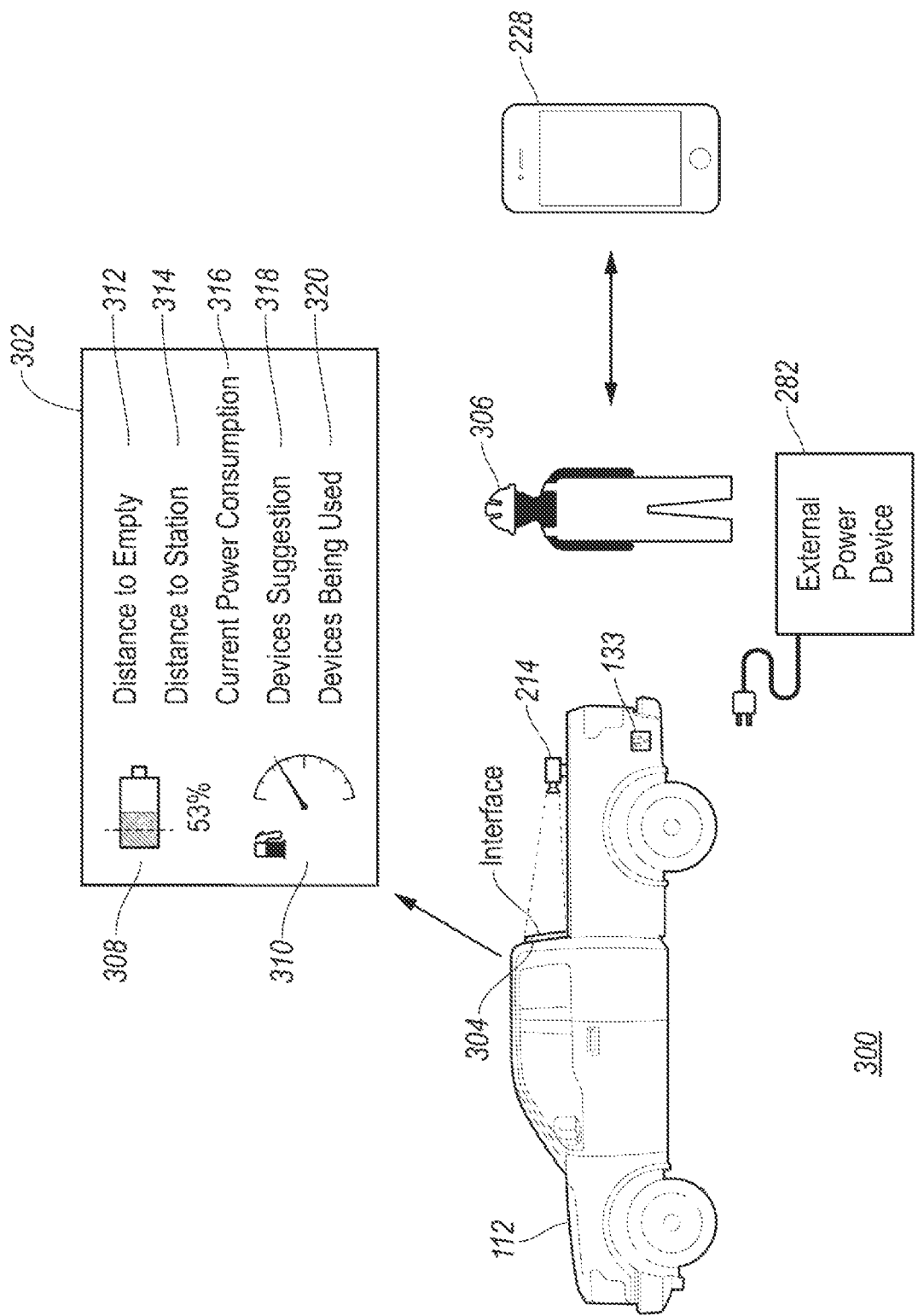
FIG. 3 is an example diagram of a vehicle projecting interface.

Referring to FIG. 3, an example diagram 300 of the vehicle projecting system is illustrated. With continuing reference to FIGS. 1 and 2, the projector 214 may be mounted externally near the bed of a pickup truck vehicle 112 in the present example. The projector 214 may be configured to project an interface 302 onto the rear cabin window 304 of the vehicle 112 to allow a user 306 to view the interface 302 from the back of the vehicle 112. Alternatively, the rear window 304 of the vehicle 112 may include a transparent display (see-through display) 214 configured to output the interface 302 while being transparent to allow the driver to see through the rear window. Alternatively, the interface 302 may be output via the mobile device 228 in communication with the vehicle 112 via a direct wireless link 230 and/or via the wireless network 272. Outputting the interface 302 via the mobile device 228 allows the user 306 to be aware of the information about the vehicle 112 while being away from the vehicle 112. The interface 302 may provide the user 306 with various information related to the power and fuel status of the vehicle 112 to prevent the depletion of the vehicle battery 124 while the external power device 282 is plugged in the power outlet 133. As an example, the displaying of the interface 302 may be triggered responsive to the vehicle 112 detecting the external power device 282 is plugged in to the power outlet 133.

An example of the interface 302 is illustrated in FIG. 3. The interface may include a battery level gauge (fuel gauge) 308 indicative of a current state-of-charge (SOC) of the traction battery 124. The SOC of the battery 124 may be presented in a percentage form although other forms such as an actual ampere hour (Ah) may be used in other embodiments. Although the present disclosure may be more applicable to a BEV situation without an internal combustion engine, the same concept may also be applicable to a hybrid vehicle. In case that the vehicle 112 is provided with the engine 118, the interface 302 may further include a fuel gauge 310 indicative of a fuel level of the vehicle 112. The interface 302 may further include a distance to empty (DTE) entry 312 dynamically calculated using the SOC of the battery 124 alone or in addition to the fuel level. The interface 302 may further include a distance to station entry 314 indicative of a distance from a current vehicle location to a predetermined station location equipped with charging/fueling facilities (e.g., an EVSE) calculated via the navigation controller 222 of the computing platform 150. The station location may include one or more predefined locations assigned to the vehicle to return to after finishing a scheduled operating task. For instance, for a work truck vehicle 112, the station location may be shop or garage associated with an entity managing the operation of the vehicle. In case that multiple station locations are present in the vehicle database, the navigation controller 222 may automatically identify the nearest location as the station location for the vehicle 112 to return to. Additionally or alternatively, in a more comprehensive scheduling system, the computing platform 105 may be configured to select one of the station locations based on an availability of EVSEs 136 at each station location. The vehicle 112 may determine a minimum SOC of the traction battery 124 based on the distance to station to ensure that the vehicle 112 has enough charge/fuel to reach the station for charging.

The interface 302 may further include a current power consumption entry 316 indicative of a power drawn from the power outlet 133 by the external power device 282 as measured by a power sensor 148 associated with the power outlet 133. Different external power devices 282 may have different power ratings. Continuing with the above pickup truck example, various tools may be associated with the vehicle 112. The external power device 282 may include a power drill having a power rating of 800 to 1,200 watts, and a power welder having a power rating of 7 to 12 kilowatts. Obviously, the two devices in the present example may have significantly different impact on the battery life as well as the driving range of the traction battery 124. Based on the power ratings of the power devices, the current SOC of the traction battery and the distance to the station, the vehicle 112 may further output a device suggestion entry 318 via the interface 302 to recommend appropriate use of the power outlet 133 such that a depletion of the traction battery 124 may be avoided. The interface 302 may further include a current device being used entry 320.

Referring to FIG. 4, an example process 400 for a vehicle power management process is illustrated. With continuing reference to FIGS. 1 to 3, the process 400 may be performed by the computing platform 150 of a BEV 112 in the present example although the process may be applied to hybrid vehicles by other controllers/components under essentially the same concept. At operation 402, the vehicle computing platform 150 detects a presence and identify of one or more external power devices 282 at the vicinity of the vehicle 112 which indicates that those detected power devices 282 may potentially be used and draw power from the traction battery 124 via the power outlet 133 in the near future. As discussed above, the computing platform 150 may detect the external power devices using one or more beacons (not shown) via the sensor 148. Alternatively, the computing platform 150 may obtain the availability information of the external devices via the mobile device 228 in communication with the vehicle via the wireless link 230. Alternatively, the user 306 may manually input the information about the external power devices 282 into the computing platform 150 via the HMI 212. With the external power devices 282 detected and identified, the computing platform may determine the power rating of the power devices 282 via various means. For instance, the power rating information may be transmitted to the computing platform 150 via the beacon or via the mobile device 228. The computing platform 150 may further have the power rating (e.g., a lookup table) stored in the storage 210 as a part of vehicle data 226. Alternatively, the computing platform 150 may be further configured to obtain the power rating of the power devices 282 from the server 278 via the TCU 270 using the identity of the devices 282.

At operation 404, responsive to detecting a power draw from the power outlet 133, the computing platform 150 starts to measure an actual power drawn from the power outlet 133 and identify which device is drawing the power. The computing platform 150 may communicate with the device currently being used via the power outlet 133 or via a wireless connection (e.g., Bluetooth connection). Alternatively, the computing platform 150 may make an assumption about the identity of the current device based on the actual power being drawn from the power outlet 133. At operation 406, the computing platform 150 presents the interface 302 to the user via the display/projector 214 and/or via the mobile device 228. The interface 302, as discussed above, may include a devices being used entry 320 based on the identification at operation 404. The interface 302 may further include a message requesting the user 306 to confirm that the current device being used as identified is correct. This confirmation request may be particularly useful in case that the identity of the current device is assumed such that the computing platform 150 may "learn" the devices to provide better identification in the future. Responsive to receiving a user feedback at operation 408, the process proceeds to operation 410 and the computing platform 150 confirms or updates the identity of the current device using the user feedback. For instance, the user 306 may be allowed to make an input via the HMI 212 of the computing platform 150 or via the mobile device 228. The user input may be a confirmation of the device as identified, or a correction of the identity of the device if wrongly identified.

At operation 412, the computing platform 150 determines the distance to station (DTS) and a distance to empty, and outputs the determination via the interface 302. As discussed above, the distance to empty may be calculated using the SOC of the traction battery 124. Additionally, the computing platform 150 may further adjust the distance to empty using a vehicle load/weight and towing status as detected via the weight sensor 148 and an ambient temperature as detected via the temperature sensor 148. Alternatively, the computing platform 150 may be configured to estimate the weight of the external devices 282 based on the identity of the devices. For instance, a power drill may have a predetermined weight of 10 kg and a power welder may have a predetermined weight of 50 kg stored in the storage 210. Responsive to the detection and identification of the power drill and welder, the computing platform 150 may estimate the load to be at least 60 kg (plus other weight) to adjust the distance to empty driving range. The distance to station, as discussed above, may be planned by the navigation controller 222 based on the present vehicle location and a predefined destination. Alternatively, the user 306 may manually set the destination via the HMI 212 and/or via the mobile device 228. As the external power device 282 continues to draw power from the traction battery 124, at operation 414, responsive to detecting the distance to station is within a first threshold of the distance to empty, the process proceeds to operation 416 to output a device suggest 318. For instance, if the distance to station is 20 miles and the distance to empty drops to below 70 miles—within 50 miles of the distance to station, the computing platform 150 may recommend against using any high-power devices (e.g., the power welder). Alternatively, the computing platform 150 may output an estimated duration for one or more devices based on the power rating and current SOC via the interface 302. As an example, the device suggestion may include a message such as "Power drill remaining time 1 hour" and "Power welder remaining time 7 minutes" or the like. At operation 418, responsive to the SOC further reducing and the difference between the distance to empty and distance to station being within a second threshold (e.g., 10 miles) lesser than the first threshold, the process proceeds to operation 420 and the computing platform 150 starts to limit the power output of the power outlet to reduce the power consumption to avoid the depletion of the traction battery 124 before arriving at the station.

The process 400 as described above is merely an example of the present disclosure and various modifications may be made and applied under essentially the same concept. For instance, instead of using the distance to empty and distance to station from operations 412 to 420, the vehicle 112 may directly compare a current SOC and a required SOC of the traction battery 124 for device suggestion and power limiting purposes in an alternative embodiment. Furthermore, the device suggestion entry 318 may be constantly displayed in the interface 302 in an alternative embodiment.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A power system for a vehicle comprising:
a battery;
a power outlet configured to supply power from the battery to a device plugged into the power outlet and external to the vehicle; and
a controller including one or more processors programmed to, responsive to detecting the device is plugged into the power outlet, selectively trigger interface output for display indicative of a recommendation against use of the power outlet with devices external to the vehicle having a power rating greater than a predefined power rating threshold based on a difference between a current state of charge of the battery and a required state of charge for the battery.

2. The power system of claim 1, wherein the controller is further programmed to selectively generate the interface output based on distance to empty and distance to station values for the vehicle.

3. The power system of claim 2, wherein the controller is further programmed to reduce the power available from the power outlet based on the difference.

4. The power system of claim 1, wherein the controller is further programmed to identify the device plugged into the power outlet.

5. The power system of claim 1, wherein the controller is further programmed to, responsive to user input, update an identity of the device plugged into the power outlet.

* * * * *